United States Patent
Kawase

(10) Patent No.: US 6,185,181 B1
(45) Date of Patent: *Feb. 6, 2001

(54) OPTICAL DATA RECORDING MEDIUM HAVING CLOCK PITS, SERVO PITS, AND AUXILIARY CLOCK PITS DISPOSED THEREON

(75) Inventor: Takeo Kawase, Nagano (JP)

(73) Assignee: Seiko Epson Corporation, Tokyo (JP)

( * ) Notice: Under 35 U.S.C. 154(b), the term of this patent shall be extended for 0 days.

This patent is subject to a terminal disclaimer.

(21) Appl. No.: 08/591,371

(22) Filed: Jan. 25, 1996

Related U.S. Application Data

(63) Continuation of application No. 07/887,372, filed on May 21, 1992, now Pat. No. 5,511,063, which is a continuation of application No. 07/523,529, filed on May 15, 1990, now abandoned.

(30) Foreign Application Priority Data

May 15, 1989 (JP) .................................................. 1-120725

(51) Int. Cl.⁷ .................................................. G11B 7/007
(52) U.S. Cl. ..................................... 369/275.3; 369/44.28
(58) Field of Search ............................. 369/44.23, 44.25, 369/44.26, 44.28, 275.3, 275.4, 44.37, 44.41, 47

(56) References Cited

U.S. PATENT DOCUMENTS

| | | | |
|---|---|---|---|
| 4,094,013 | 6/1978 | Hill et al. | 369/32 |
| 4,313,191 | 1/1982 | Winslow et al. | 369/275.3 |
| 4,736,352 | 4/1988 | Satoh et al. | 369/275.3 |
| 4,831,609 | 5/1989 | Suzuki | 369/44.37 |
| 4,858,221 | 8/1989 | Romeas | 369/275.3 |
| 4,980,882 | 12/1990 | Baer et al. | 369/275.3 |
| 5,063,546 | 11/1991 | Ito et al. | 369/44.26 |
| 5,511,063 * | 4/1996 | Kawase | 369/275.3 |

FOREIGN PATENT DOCUMENTS

| | | | |
|---|---|---|---|
| 63-42035 | 2/1988 | (JP) | 369/275.4 |
| 63-44322 | 2/1988 | (JP) | 369/275.3 |
| 1-201847 | 8/1989 | (JP) | 369/275.4 |

\* cited by examiner

*Primary Examiner*—David D. Davis
(74) *Attorney, Agent, or Firm*—Pillsbury Madison & Sutro LLP

(57) ABSTRACT

An optical disk with clock pits disposed on tracks at predetermined intervals extending in a radial direction of the optical disk. Servo pits are arranged wobbly with respect to the tracks and auxiliary clock pits are arranged in such a manner that at least one auxiliary clock pit is provided between a pair of clock pits adjacent to one another in the radial direction of the optical disk.

1 Claim, 5 Drawing Sheets

TRACKING SERVO CKT

OPTICAL DATA RECORDING MEDIUM HAVING CLOCK PITS, SERVO PITS, AND AUXILIARY CLOCK PITS DISPOSED THEREON

This is a continuation of application No. 07/887,372, filed May 21, 1992, U.S. Pat. No. 5,511,063, which is a Continuation of application No. 07/523,529, filed on May 15, 1990, abandoned.

BACKGROUND OF THE INVENTION

1. Field of the Invention

This invention relates to an optional data recording medium, and more particularly to an optical disk for a sampled servo system.

2. Prior Art

An optical data recording medium (hereinafter referred to as "an optical disk", when applicable) is an optical memory device for recording or reproducing data with a laser beam focused on its recording surface, and therefore the data recording and reproducing operation with the optical disk needs a focusing operation for focusing a laser beam on the recording surface and a tracking operation for causing the focused laser beam to scan the recording surface along tracks.

The focusing operation has been substantially established using means well known in the art. On the other hand, the tracking operation is provided with a so-called "continuous servo system" in which grooves for guiding the focused light beam are employed. Data are recorded in the grooves or in the spaces between the grooves (hereinafter referred to as "on land", when applicable) or reproduced therefrom. A so-called "sampled servo system" in which clock signals formed with clock pits arranged at predetermined intervals, the signals of servo pits wobbly with respect to the direction of a track, are sampled to perform the tracking operation.

As is apparent from the above-description, the specific feature of the sampled servo system resides in that a tracking operation can be performed without provision of guide grooves in a recording surface.

FIG. 2 is an explanatory diagram showing the arrangement of a conventional optical disk for the sampled servo system. As shown in FIG. 2, tracks 203 are generated on a recording surface as indicated by the broken lines, and clock pits 201 are formed on the tracks 203 of the recording surface at predetermined interval, and in addition servo pits 202 are formed in the recording surface in such a manner that they are wobbly with respect to the direction of a track. The clock pits are arranged so that clock pit signals are generated with a constant time interval at the time of a reproducing operation. As a result, the clock pits are arranged in alignment with a radial direction of a disk with a predetermined angle. Recording pits representing data are not shown in FIG. 2.

In the sampled servo system, the signals of the servo pits 202 are sampled and outputted as tracking error signals. FIG. 3 is a block diagram showing a tracking servo circuit according to the conventional sampled servo system. FIG. 4 is a time chart showing various signals in FIG. 3.

A photodetector (not shown) converts the intensity of light reflected from pits of the optical disk into an electrical signal, which is applied, as a reproducing signal (a) to, the tracking servo circuit shown in FIG. 3. In the tracking servo circuit, a peak detecting circuit 10 detects the peak of the reproducing signal, and converts it into a digital pit signal (b), which is applied to a clock pit signal extracting circuit 11. The pit signal (b) includes the signals of servo pit 202, clock pit 201 and recording pit (not shown). The clock pit signal extracting circuit 11 extracts only the clock pit signal (c) from the pit signal (b). The clock pit signal (c) thus extracted is applied to a PLL (phase locked loop) circuit 12, which outputs a clock signal (d), whose frequency is an integer times that of the clock pit signal (c), in synchronization with the latter (c). The clock signal (d) is applied to a sampling timing signal generating circuit 13, which in turn produces sampling timing signals 1 and 2 for sampling changes which are caused in the reproducing signal (a) by the servo pits 202. The sampling timing signals 1 and 2 are applied to a sample and hold circuit I 14 and a sample hold circuit II 15, respectively. In the sample and hold circuits I and II, the signals of two servo pits are sampled with the sampling timing signals 1 and 2, so that sampled reproducing signals (servo pit signals) 1 and 2 are outputted. The sampled reproducing signals 1 and 2 are applied to a differential amplifier 16, which outputs a tracking error signal (e).

The tracking error signal (e) thus provided by the tracking servo circuit is applied to a circuit which, in response to it, operates to displace a laser beam lens actuator to decrease the tracking error, so that a tracking servo is effected to accomplish the tracking operation.

In the conventional optical disk according to the sampled servo system, the clock pits are located only on the tracks as shown in FIG. 2. Therefore, in the case where the tracking operation has been accomplished and the focused light beam is scanning the tracks, the signals of the clock pits can be detected. However, before the tracking operation is accomplished, the focused light beam may scan the inter-tracks. In this case, the signals of the clock pits are decreased, as a result of which the clock signals may not be generated sufficiently. If the clock signals are not generated satisfactorily, then the jitter of the clock signals is increased, and the sampling of the signals of the servo pits is not correctly carried out. As a result, the time required for accomplishment of the tracking operation is increased. In addition, in the case where the tracking operation is not achieved yet, the focused light beam may jump over the tracks at the time of start or access. Therefore, at the time of start, it may be necessary to repeatedly perform the starting operation; and at the time of access, the access time may be increased.

SUMMARY OF THE INVENTION

Accordingly, an object of this invention is to eliminate the above-described difficulties accompanying a conventional optical disc of sampled servo system.

More specifically, an object of the invention is to provide an optical disk of a sampled servo system reduced clock signal jitter, which can be started with high stability and positively accessed at high speed.

The foregoing object and other objects of the invention have been achieved by providing an optical data recording medium which, according to one aspect of the invention, comprises: clock pits formed on tracks at predetermined intervals; servo pits arranged wobbly with respect to the tracks; and auxiliary clock pits arranged in such a manner that at least one auxiliary clock pit is located between two clock pits which are adjacent to each other radially of the optical data recording medium.

In the optical data recording medium, according to another aspect of the invention, the clock pits adjacent to one another radially of the optical data recording medium are formed in such a manner as to overlap one another, thus providing an auxiliary clock groove extended in a direction perpendicular to the tracks.

In the optical data recording medium thus constructed, the clock pit signals are less variable or substantially not variable in peak, and clock pulses signals are outputted with high accuracy.

The nature, principle and utility of the invention will become more apparent from the following detailed description when read in conjunction with the accompanying drawing.

DETAILED DESCRIPTION OF THE PREFERRED EMBODIMENTS

Preferred embodiments of this invention will be described with reference to the accompanying drawings.

Figure 1:
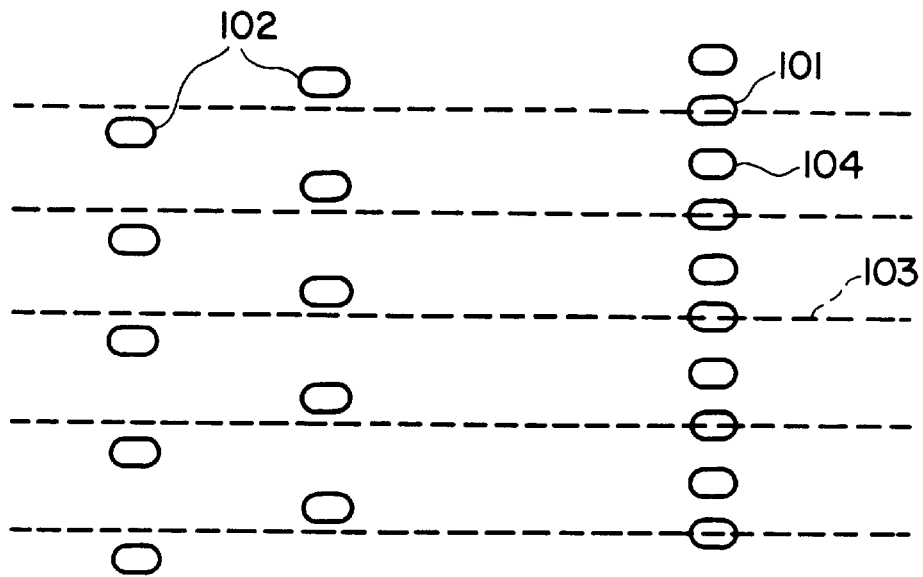
FIG. 1 is an explanatory diagram showing one example of an optical data recording medium, or optical disk, according to this invention.
Figure 2:
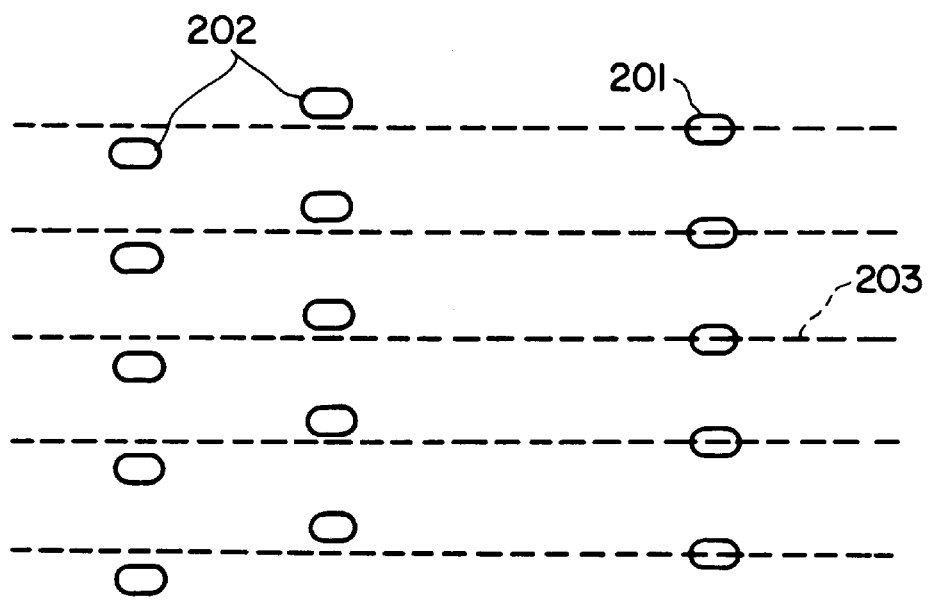
FIG. 2 is an explanatory diagram showing a conventional optical disk.

FIG. 1 is an explanatory diagram showing one example of an optical disk according to the invention. Similarly as in the conventional optical disk of sample servo system shown in FIG. 2, clock pits 101 are formed on tracks 103, and servo pits are formed on the recording surface in such a manner that they are wobbly with respects to the tracks 103. In the optical disk of the invention, auxiliary clock pits 104 are formed between the clock pits 101 in such a manner that one auxiliary clock pit 104 is located between two clock pits 101 which are adjacent to each other radially of the disk. With a light beam focused on the optical disk, the signals of the clock pits 101 and servo pits 102 are detected. Here, a detailed description of the signals of the servo pits will be omitted, because, in the invention, the characteristic of reproduction of the clock pits is important, and the signals of the servo pits will not affect the signals of the clock pits. The clock pit signals are obtained similarly as in the case of FIG. 3.

Figure 5:
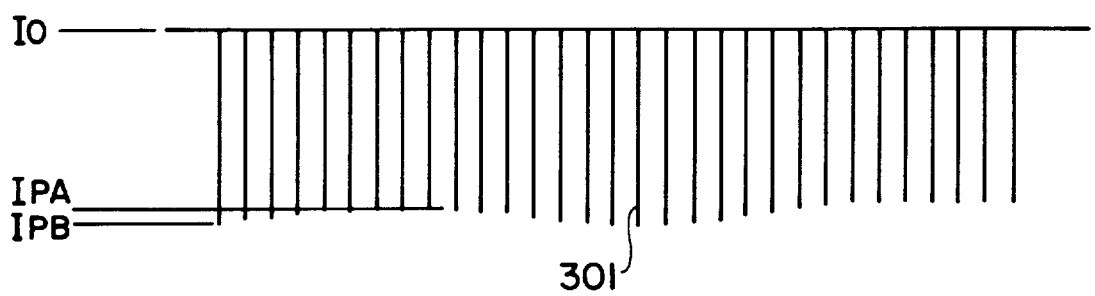
FIG. 5 is a waveform diagram showing clock pit signals which are reproduced from the optical disk of the invention without tracking operation.
Figure 6:
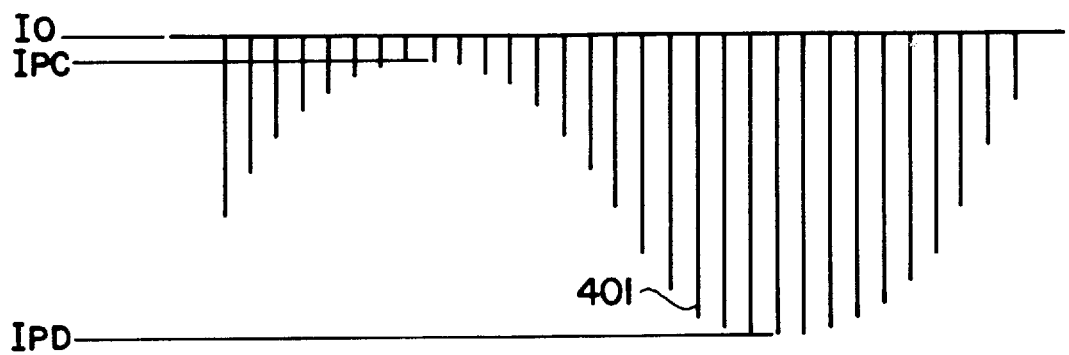
FIG. 6 is a waveform diagram showing clock pit signals which are reproduced from the conventional optical disk without tracking operation.

FIG. 5 shows the waveform which is formed by reproduction of the clock pits of an optical disk which has no servo pits (102 in FIG. 1). More specifically, FIG. 5 shows the signals of the clock pits 101 and the auxiliary clock pits 104 provided when the focusing operation is carried out and the tracking operation is not carried out. The regions having no pit are of mirror surface, and are therefore high in reflection factor, thus providing a high signal level $I_o$. The regions having pits are low in reflection factor, thus providing clock pit signals 301 which change in peak value from $I_{PA}$ to $I_{PB}$. FIG. 6 shows the waveform which is formed for the conventional optical disk of sampled servo system under the same conditions. In this case, the resultant clock peak signals 401 change greatly from $I_{PC}$ to $I_{PD}$. Before the tracking operation is accomplished, the focused light beam scans not only the tracks 201 but also the inter-tracks. Therefore, in the case of the conventional optical disk of sampled servo system, for the inter-tracks, the peak of the clock pit signals will be the level $I_{PC}$ which is close to the level $I_c$ of the mirror surface. On the other hand, in the case of the optical disk of the invention, the auxiliary clock pits 104 are arranged between the tracks, and accordingly the clock pit signals are less in the variation of peak. The conventional optical disk and the optical disk of the invention were tested with the following results:

$|I_{PC}-I_{PD}|/I_{PD}=0.8$ $|I_{PA}-I_{PB}|/I_{PB}=0.1$

Thus, the clock pits of the optical disk according to the invention is superior in the characteristic of reproduction of clock pits to the conventional optical disk in that the peak is less variable.

Figure 3:
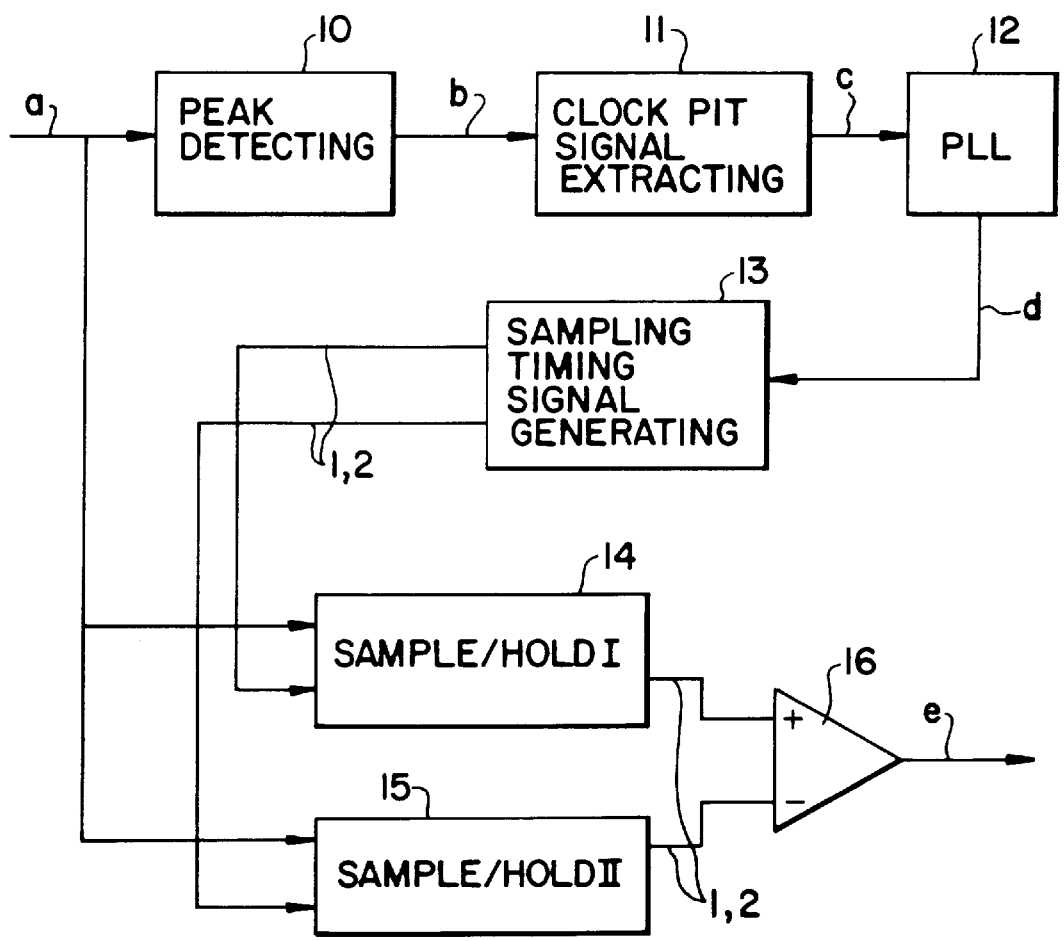
FIG. 3 is a block diagram showing a conventional tracking servo circuit.
Figure 4:
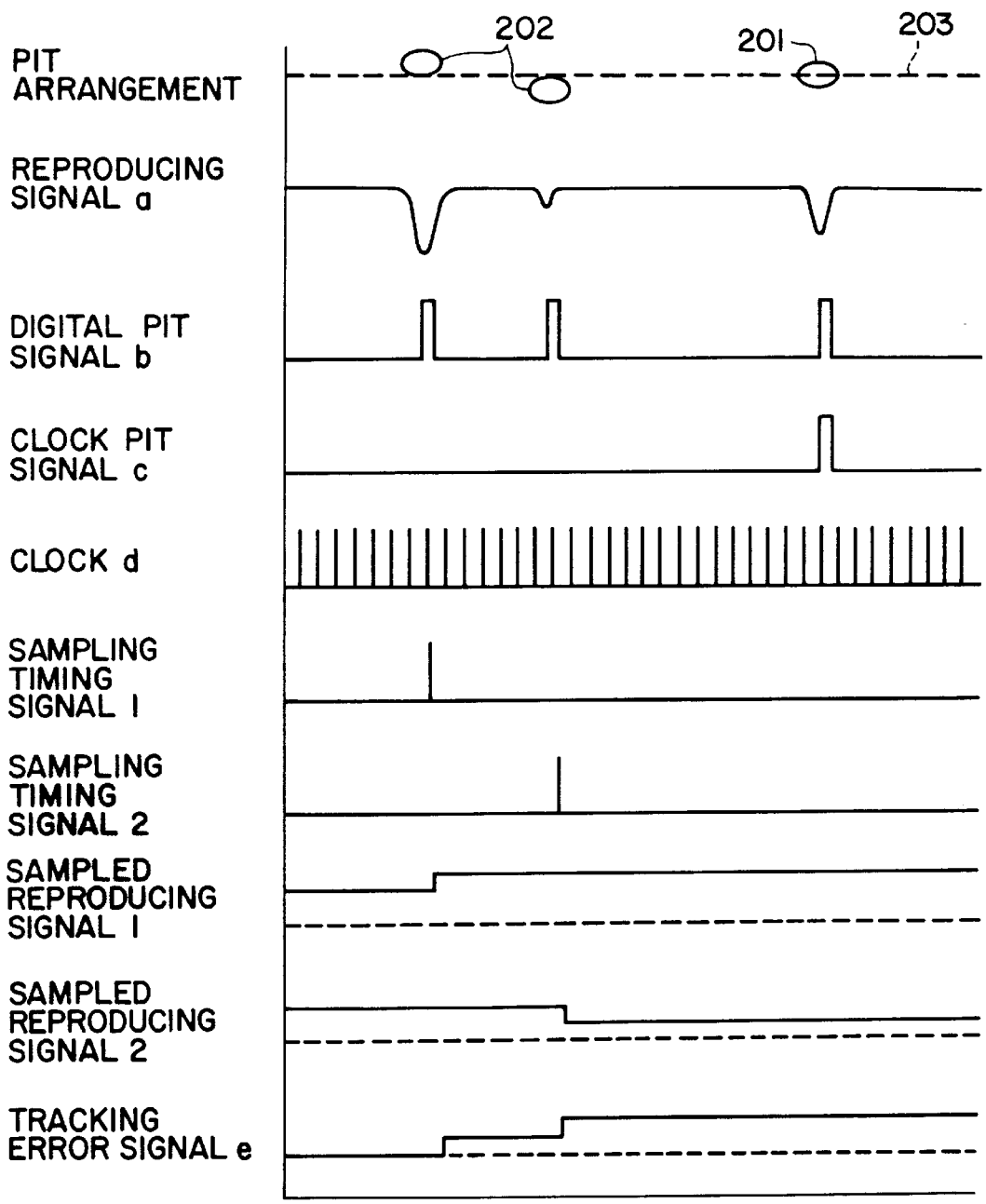
FIG. 4 is a time chart for a description of the operation of the conventional tracking servo circuit shown in FIG. 3.

The clock pit signal 301 is digitalised and applied to the PLL circuit 12, which outputs a clock signal (d), whose frequency is an integer times the frequency of clock pit signal, in synchronization with the latter signal (FIG. 3). The clock signal (d) is used to sample the servo pit signals of the reproducing signal (a) to form the tracking error signal (e), thereby to achieve a tracking operation. When a clock pit signal which is greatly variable as shown in FIG. 4 is digitalized, the peak may not be detected, as a result of which a missing pulse may be produced or a phase error may be increased. When the signal is applied to the PLL circuit 12, then the jitter of the output clock signal (d) is increased. As a result, the timing of sampling the servo pit signals becomes irregular, and an erroneous tracking error signal is generated accordingly. Hence, the tracking operation may not be achieved, or may take a relatively long time, at the time of start or access. The clock signal is also used for data recording and reproducing operations. If, immediately after accessing, and before the jitter of the clock signal is eliminated, a data recording operation is carried out, then the following data reproducing operation will be adversely affected; and if a data reproducing operation is carried out, then the reproduced data may suffer from errors.

The conventional optical disk of sampled servo system suffers unavoidably from the above-described difficulties. On other hand, with the optical disk of the invention, the state that the tracking operation has not been achieved yet is smoothly shifted into the state that the tracking operation has been achieved, because the clock pit signals 301 are less variable in peak as shown in FIG. 5. In addition, the accessing operation can be achieved more positively and more quickly.

In the embodiment shown in FIG. 1, only one auxiliary clock pit 104 is provided between two clock pits 101 which are adjacent to each other radially of the disk; however, the invention is not limited thereto or thereby. That is, a plurality of auxiliary clock pits may be provided therebetween. The characteristic of reproduction of clock pits is improved in proportion to the number of auxiliary clock pits.

Figure 7:
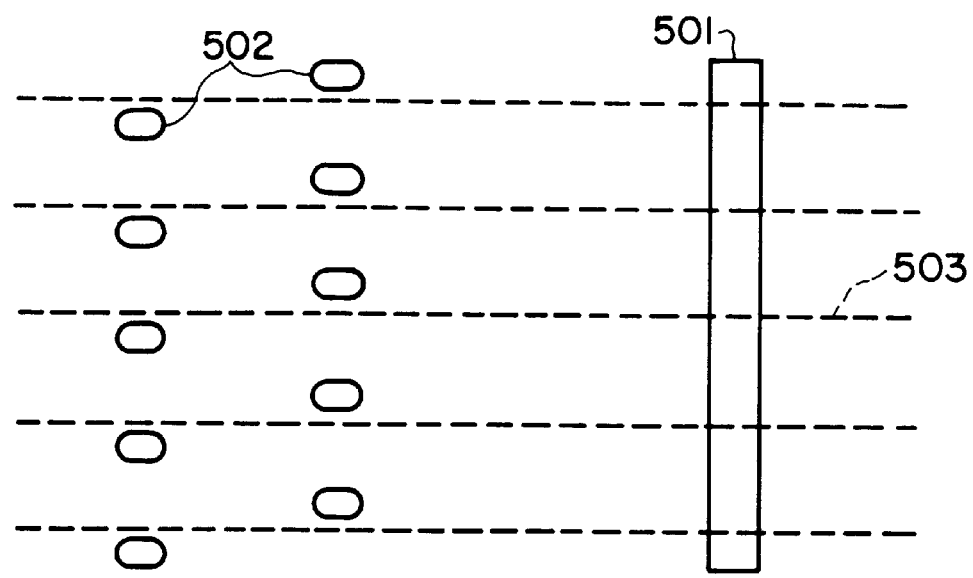
FIG. 7 is an explanatory diagram showing another example of the optical disk according to the invention.

FIG. 7 is an explanatory diagram showing another example of the optical disk according to the invention. The optical disk shown in FIG. 7 is obtained as follows: In the optical disk shown in FIG. 1, the number of auxiliary clock pits 104 is increased until they form a clock groove 501 which is extended in a direction perpendicular to the tracks.

Figure 8:
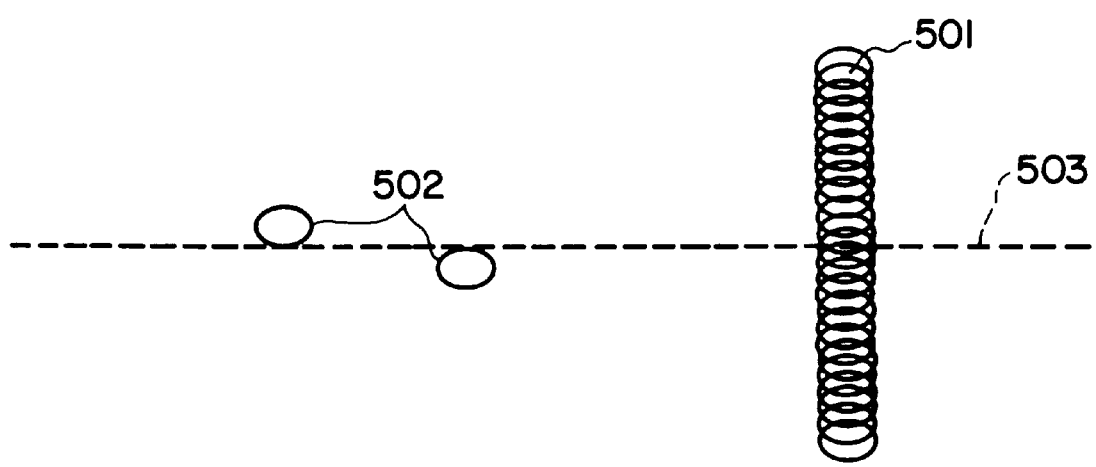
FIG. 8 is an explanatory diagram for a description of a method of forming a clock groove in the optical disk shown in FIG. 7.

That is, the optical disk has the servo pits wobbly with respect to the tracks 503, and the above-described clock groove 501. The clock groove is formed as follows: As shown in FIG. 8, a laser beam is deflected radially of the disk with a small pitch in such a manner that a number of clock pits 101 overlap one another, thus forming the clock groove 501. In this case, the disk is subjected to multiple exposure. However, since an original plate of glass is optically exposed through a photo-resist layer formed on it to form the master disk, the depth of the pits will never exceed the thickness of the photo-resist layer. Hence, in the master disk thus formed, clock groove 501 is uniform in depth.

When, with the optical disk shown in FIG. 8, reproduction of the clock pit signal is carried out even before the completion of the tracking operation, the peak remains substantially unchanged. Thus, it may safely be said that the optical disk is ideal in function.

The provision of the auxiliary clock pits may affect the economy in manufacture of the optical disk as follows:

It is true that the manufacturing cost of the disk depends partly on the number of auxiliary clock pits. However, in the case where the number of auxiliary clock pits between two adjacent clock pits is only one, the manufacturing cost will not be increased so much, because a two-beam master cutting machine can be used to form those pits. That is, with the machine, one of the beams is used to form the clock pits and servo pits, and the other is used to form the auxiliary clock pits. Thus, in this case, the provision of the auxiliary clock pits will not increase the manufacturing cost so much. Hence, it is practical that one auxiliary clock pit is provided between two adjacent tracks. The second embodiment, the optical disk with the clock groove is ideal in function; however, it is disadvantageous in that its manufacturing cost is higher than the first embodiment.

As was described above, in the optical disk with the servo pits and the clock pits, the auxiliary clock pits are formed in such a manner that at least one auxiliary pit is provided between two clock pits adjacent to each other radially of the optical disk, or the auxiliary clock pits are overlapped one another to form the clock groove. Hence, the clock pit signals reproduced before the tracking operation is achieved are less variable or substantially not variable in peak value. As a result, the clock signal is minimized in jitter which is produced by utilising the clock pit signal, and accordingly the starting operation is carried out with high stability, and the accessing operation is achieved quickly and stably. In addition, the conventional data recording and reproducing device provided for optical disks of sampled servo system can be used for the optical disk of the invention as it is. That is, the optical disk of the invention is interchangeable with the conventional one, and is superior in performance to the latter.

While there has been described in connection with the preferred embodiments of the invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. An optical data recording medium having a recording surface on which a plurality of tracks are defined, comprising:

a plurality of clock pits disposed along said plurality of tracks at predetermined intervals;

a plurality of servo pits arranged wobbly with respect to said plurality of tracks; and a plurality of auxiliary clock pits, each auxiliary clock pit in said plurality of auxiliary clock pits being located on a non-track portion of said recording surface between a pair of said clock pits that are adjacent to each other in a radial direction of said optical data recording medium.

* * * * *